United States Patent
Savolainen

(10) Patent No.: US 6,327,466 B1
(45) Date of Patent: Dec. 4, 2001

(54) METHOD AND ARRANGEMENT FOR SETTING THE CHARGE RATE IN A WIRELESS PAY PHONE

(75) Inventor: Kimmo Savolainen, Kempele (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/242,230

(22) PCT Filed: Aug. 11, 1997

(86) PCT No.: PCT/FI97/00470

§ 371 Date: Mar. 17, 1999

§ 102(e) Date: Mar. 17, 1999

(87) PCT Pub. No.: WO98/07270

PCT Pub. Date: Feb. 19, 1998

(30) Foreign Application Priority Data

Aug. 12, 1996 (FI) ........................................ 963142

(51) Int. Cl.⁷ .................................................. H04M 11/00
(52) U.S. Cl. ........................... 455/407; 455/406; 455/409
(58) Field of Search ..................................... 455/406, 407, 455/409, 427; 379/114

(56) References Cited

U.S. PATENT DOCUMENTS

| | | | |
|---|---|---|---|
| 5,303,297 | * | 4/1994 | Hillis ..................................... 455/406 |
| 5,577,100 | * | 11/1996 | McGregor et al. ................... 455/406 |
| 5,631,947 | * | 5/1997 | Wittstein et al. ..................... 455/409 |
| 5,749,052 | * | 5/1998 | Hidem et al. ......................... 455/406 |
| 5,799,255 | | 8/1998 | Berg et al. ............................. 455/551 |
| 5,848,138 | * | 12/1998 | Sarpola et al. ........................ 379/114 |
| 5,946,614 | * | 8/1999 | Robbins et al. ...................... 455/407 |
| 6,070,066 | * | 5/2000 | Lundborg et al. .................... 455/406 |
| 6,073,012 | * | 6/2000 | Vanden Heuvel et al. .......... 455/427 |

FOREIGN PATENT DOCUMENTS

| | | |
|---|---|---|
| 0597638 A1 | 5/1994 | (EP) . |
| 97510 | 12/1996 | (FI) . |
| 97511 | 12/1996 | (FI) . |
| 2272607 | 5/1994 | (GB) . |
| WO 96/03832 | 2/1996 | (WO) . |
| WO 96/11553 | 4/1996 | (WO) . |
| WO 96/20570 | 7/1996 | (WO) . |
| WO 97/08884 | 3/1997 | (WO) . |

OTHER PUBLICATIONS

Finnish Office Action (and English translation thereof).

PCT International Search Report.

* cited by examiner

*Primary Examiner*—Nay Maung
(74) *Attorney, Agent, or Firm*—Perman & Green, LLP

(57) ABSTRACT

The destination zone of a call is defined (2) according to the prior art in a wireless pay phone, for example, by analyzing a selected phone number, and the present invention is characterized in that, additionally, the location of the pay phone is defined (3) and the originating zone of the call is defined based on the location, and the charge rate is set based on at least the originating zone and destination zone of the call. The charge rate is advantageously set by means of a tariffing algorithm realized in the pay phone, which algorithm specifies several charge rate classes and corresponding parameter values, which set (7) a charge rate corresponding to a charge rate class. To set a charge rate class, first a distance class may be set (5) based on the originating zone and destination zone, and then a charge rate class may be set (6) based on the distance class and possibly other factors. The present invention makes it possible to realize a tariffing within a wireless pay phone itself, which functions sufficiently well and fairly even though the pay phone roams extensively, for example, in different countries.

9 Claims, 3 Drawing Sheets

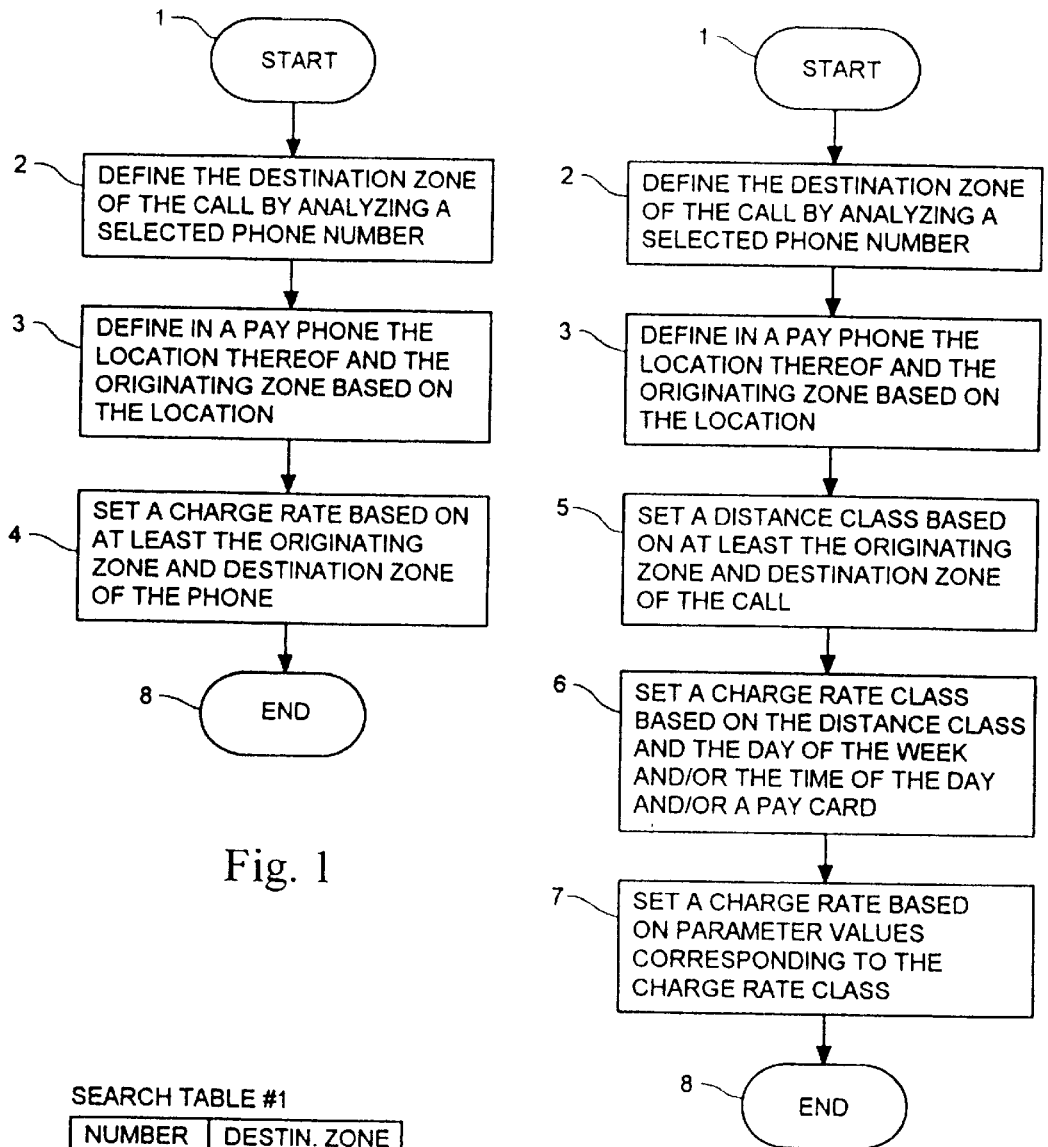

SEARCH TABLE #2

| MCC | MNC | ORIGIN. ZONE |
|-----|-----|--------------|
| 111 | 123 | 0 |
| 111 | 133 | 1 |
| 222 | X   | 3 |
| 333 | X   | 2 |
| 444 | 456 | 3 |
| ⋮   | ⋮   | ⋮ |

SEARCH TABLE #3

|   | 0 | 1 | 2 | 3 | 4 | 5 | 6 | 7 | 8 |
|---|---|---|---|---|---|---|---|---|---|
| 0 | 0 | 0 | 2 | 2 | 2 | 2 | 2 | 3 | 3 |
| 1 | 4 | 0 | 4 | 4 | 2 | 2 | 2 | 2 | 2 |
| 2 | 3 | 3 | 0 | 0 | 3 | 3 | 1 | 1 | 1 |
| 3 | 1 | 5 | 5 | 0 | 2 | 4 | 4 | 4 | 4 |
| 4 | 6 | 3 | 3 | 3 | 0 | 1 | 2 | 2 | 2 |
| 5 | 6 | 5 | 6 | 5 | 5 | 0 | 1 | 1 | 3 |
| 6 | 6 | 5 | 5 | 5 | 5 | 5 | 0 | 1 | 5 |
| 7 | 6 | 4 | 4 | 4 | 4 | 4 | 4 | 0 | 4 |
| 8 | 6 | 3 | 3 | 3 | 3 | 3 | 3 | 3 | 0 |

SEARCH TABLE #4

| DISTANCE CLASS | DAY | TIME | CARD | CHARGE RATE CLASS |
|---|---|---|---|---|
| 0 | MON/TUE/WED | 0, 1, 2 | CREDIT | 0 |
| 0 | MON/TUE/WED | 3, 4, 5, 6, 7 | CREDIT | 3 |
| 0 | THU/FRI | ALL | CREDIT | 2 |
| 0 | MON/TUE/WED THU/FRI/SAT | 0, 1, 2, 3, 4, 5 | PHONE | 2 |
| 0 | MON/TUE/WED THU/FRI/SAT | 6, 7 | PHONE | 3 |
| 0 | SUN | ALL | PHONE | 3 |
| 1 | ALL | ALL | ALL | 2 |
| 2 | ALL | 0, 1, 2, 3, 4 | ALL | 4 |
| 2 | ALL | 5, 6, 7 | ALL | 5 |
| 3 | ALL | ALL | ALL | 5 |
| 4 | ALL | ALL | ALL | 5 |
| 5 | ALL | ALL | ALL | 4 |
| 6 | MON/TUE | ALL | ALL | 3 |
| 6 | WED/THU/FRI | ALL | ALL | 5 |
| 6 | SAT/SUN | ALL | ALL | 1 |

Fig. 7

SEARCH TABLE #5

| CHARGE RATE CLASS | PARAM. 1 | PARAM. 2 | PARAM. 3 | PARAM. 4 |
|---|---|---|---|---|
| 0 | A1 | S1 | B1 | T1 |
| 1 | A2 | S2 | B1 | T1 |
| 2 | A2 | S2 | B2 | T2 |
| 3 | 0 | 0 | 0 | 0 |
| 4 | 0 | 0 | 0 | 0 |
| 5 | A3 | S3 | B2 | T2 |

Fig. 8

METHOD AND ARRANGEMENT FOR SETTING THE CHARGE RATE IN A WIRELESS PAY PHONE

BACKGROUND OF THE INVENTION

1. Field of Invention

The present invention relates to setting the charge rate in a wireless pay phone.

2. Description of the Related Art

Today it is becoming increasingly common to use wireless pay phones in various vehicles, such as trains, boats or buses. It becomes difficult to set the charge rate of calls or other services if a vehicle in which a pay phone is located travels over a broad area, for example, in several different countries or, more generally, in several areas that affect charge rates, which are specified by call tariffing. The originating zone of a call made with a roaming wireless pay phone may also change from time to time, which should also be taken into consideration in setting the charge rate. A user naturally expects the pay phone charge rate to be similar to that of his or her own mobile phone for a given call or service. A provider of a pay phone service also benefits if the ratio between the pay phone charge rate and the actual charge rate of a call or service is always nearly the same or at least under the control of the provider.

No reliable and flexible solution currently exists for setting the charge rate in a wireless pay phone that takes into account the originating zone and destination zone of a call. Until now, the charge rate has been primarily set based on the selected phone number or service number. It has also been possible to take a pay card used to operate a pay phone into account in setting the charge rate. For wireless phones where the originating zone of a call does not change and the operator is therefore always the same, the charge rate may be set by using a net tariffing service, such as AoC (Advice of Charge) for GSM phones and Q1Q2 for NMT phones. However, it is difficult to use a net tariffing service if a pay phone roams and the net and operator changes, because uninterrupted availability and reliability of the service cannot be guaranteed.

The charge rate of a roaming pay phone has been set by loading a charge rate table into the phone. The charge rate table is based on either the charge rate of the predominant call originating zone or an average charge rate of the area in which the vehicle travels. In order to ensure that the right charge rates are applied, a new charge rate table should be loaded into the pay phone each time it enters an area with different tariffing for calls originating in that area, which may be a different country. The provider of the service should replace the table, and this in itself is difficult to arrange. It has been suggested that a new charge rate table could be loaded by means of a radio interface using a short message service or a modem. The quantity of information may be from a few kilobytes to 10 kilobytes, which would require a considerable amount of time to transfer. For example, 10 kilobytes is equivalent to 100 messages in a typical short message service, which would require at least 6 minutes to send. At least one minute of air time would be needed to send this information by modem. If it is arranged so that a new table is loaded in conjunction with certain handovers, this would result in a considerable number of extra data transfers, because handovers occur often in a moving vehicle.

SUMMARY OF THE INVENTION

For simplicity, the present application mainly speaks of a "call" and a "phone number" in referring to, for example, of "the destination zone of a call" and of "the definition of a destination zone based on a selected phone number." Here a "call" also refers to other services that may be used by means of a pay phone, and which require making a "call" to a certain "phone number", which here may also be a service number.

The purpose of the present invention is to provide a method and arrangement for setting the charge rate in a wireless pay phone, while avoiding the above-mentioned problems and making it possible to set the right charge rate in a wireless pay phone in all situations.

The method according to the present invention for setting the charge rate in a wireless pay phone, which method defines the destination zone of a call, is characterized in that it comprises defining the location of the pay phone, defining the originating zone of the call based on said location, and setting the charge rate based on at least said originating zone and destination zone of the call.

In one embodiment of the method, the charge rate for a pay phone is set using a tariffing algorithm.

A tariffing algorithm may specify several charge rate classes, whereupon a charge rate is set by finding a charge rate class corresponding to the originating zone and destination zone. In one advantageous embodiment, parameter values corresponding to charge rate classes are specified, and the parameter values set a charge rate corresponding to a charge rate class.

Setting of a charge rate class may be affected not only by the originating zone and destination zone, but also by the day of the week and/or hour of the day, or by a pay card used in a pay phone.

The arrangement according to the present invention for setting the charge rate for a pay phone, which includes a mobile phone part essentially comprising a mobile phone that operates in a mobile station system, and a pay phone part comprising pay phone functions, including analysis of a selected phone number to define the destination zone of a call, is characterized in that the mobile phone part and pay phone part cooperate for making location information maintained in the mobile phone part available for use by the pay phone part, the pay phone part defines the originating zone of a call based on the location information, and the pay phone part includes a tariffing algorithm implemented therein, which sets the charge rate based on at least the originating zone and destination zone of the call.

In one embodiment of the arrangement, the tariffing algorithm comprises a first part that sets a distance class based on the originating zone and destination zone, and said algorithm may also comprise a second part that sets a charge rate class based on at least the distance class, and a third part that specifies several charge rate classes and corresponding parameter values, which set a charge rate corresponding to a charge rate class.

The method and arrangement according to the present invention can be used to flexibly set a charge rate with sufficient correctness and fairness even for wireless pay phones that roam over large areas. The solution according to the present invention also utilizes as little memory space of the pay phone as possible.

The present invention and certain of its embodiments are described in more detail in the following, with references to the enclosed drawings.

BRIEF DESCRIPTION OF THE DRAWINGS

FIG. 1 is a flow chart that generally presents a method according to the present invention, FIG. 2 is a flow chart that presents an embodiment of the method according to the present invention, FIG. 3 presents an embodiment of an arrangement according to the present invention as a block diagram, and FIGS. 4–8 present examples of search tables utilized by a tariffing algorithm according to a certain embodiment of the present invention to specify a charge rate.

DETAILED DESCRIPTION OF THE INVENTION

Figures 3, 5, 6:
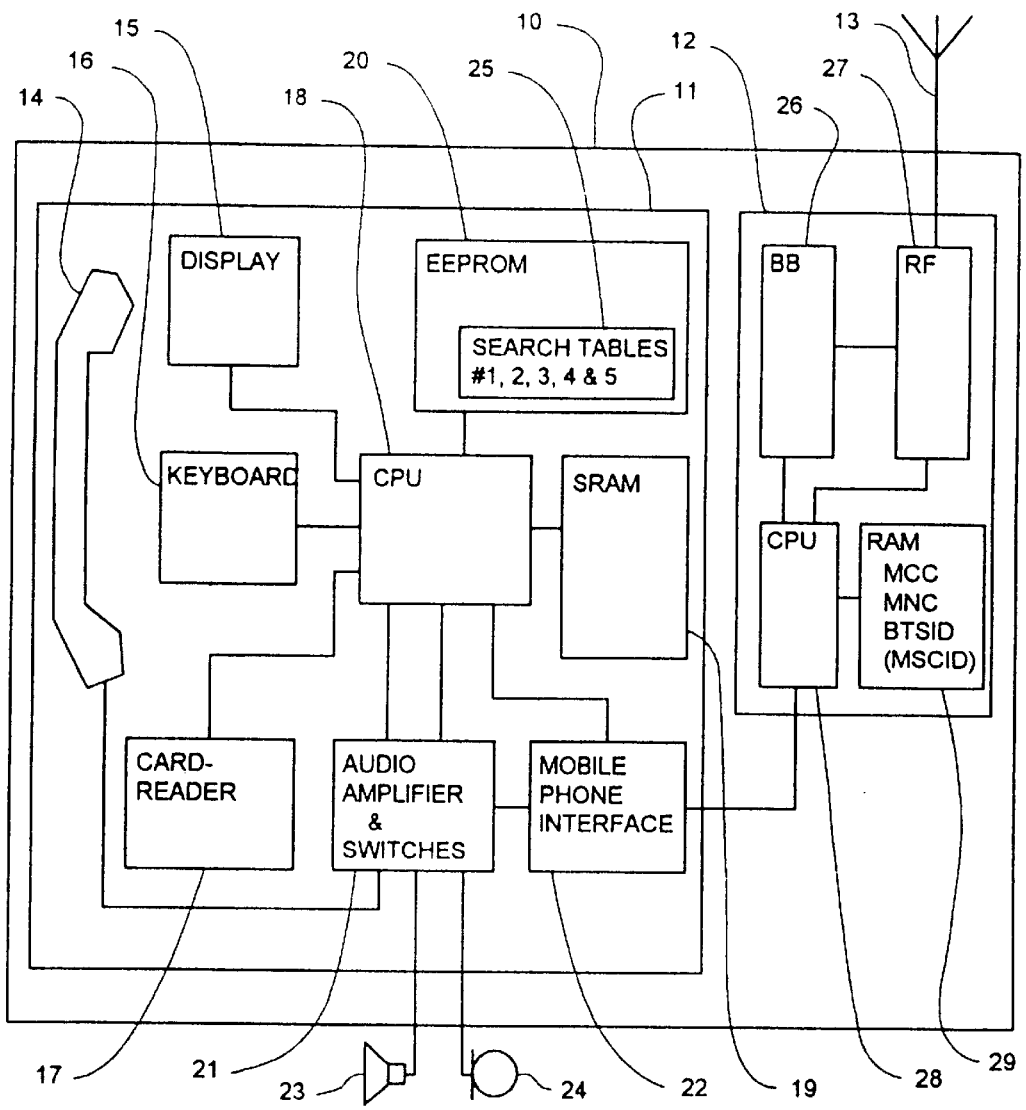

An advantageous embodiment of the method and arrangement according to the present invention is explained in the following with references first to FIGS. 1, 2 and 3. An essential part of this advantageous embodiment of the present invention is the realization of a tariffing algorithm in a pay phone itself that is capable of setting a charge rate based on at least the originating zone and destination zone of a call. The algorithm sets the charge rate by utilizing search tables stored in the memory of the pay phone. Examples of search tables are presented in FIGS. 4–8, which are explained in more detail later.

As shown in general in FIG. 1, setting of the charge rate in a wireless pay phone according to the present invention is based on first defining the destination zone of a call according to the prior art, for example, by analyzing the selected phone number in a customary manner in phase 2 of the method. Furthermore, in the method according to the present invention, the location of the pay phone is defined in phase 3 and the originating zone is defined based on the location. Definition of the location comprises retrieval of location information for use by a tariffing algorithm. Continuously updated location information is obtained from a mobile phone part included in the pay phone. In phase 4 the charge rate is set based on at least the originating zone and destination zone. As it was noted above, setting of the charge rate in different applications may be affected by other factors in addition to the originating zone and destination zone.

In the embodiment shown in FIG. 2, the method proceeds to phase 3 in the same manner as in the flow chart of FIG. 1. Then, a distance class is set in phase 5 based on the originating zone and destination zone. Setting a distance class reduces the number of alternatives in setting the charge rate based on different originating zone/destination zone combinations. In phase 6 the charge rate class is set based on the distance class and other selected factors, such as the day of the week and/or the time and/or a pay card. Setting the charge rate class further reduces the number of alternatives resulting from combinations of different factors for which a charge rate needs to be set. In phase 7 a charge rate is set from parameter values corresponding to a charge rate class. This method produces a reasonable number of alternative charge rates, which set the charge rate for different calls and services with sufficient correctness and fairness.

FIG. 3 shows a simplified presentation of a typical wireless pay phone in which the charge rate is set according to the present invention. The wireless pay phone 10 includes a pay phone part 11 and a mobile phone part 12, which is essentially a mobile phone that operates in a mobile station system. The mobile phone part 12 is presented here as a very general block diagram, which includes a radio frequency part 27 to which an antenna 13 is connected, a base frequency part 26, and a processor unit 28, which controls mobile phone operation and uses memory 29. The mobile phone part 12 always updates its location information when it registers into a network and while it is operating thereafter. It stores the location information, which may be a country code MCC, a net code MNC, a base station code BTSID, or in some systems, such as an AMPS system, an exchange code MSCID, as shown in memory block 29. The pay phone part 11 includes a user interface consisting of a receiver 14, a display 15, a keyboard 16 and a card reader 17. A processor unit 18 controls pay phone operation and uses RAM memory 19, which in this case is SRAM memory, and ROM memory 20, which in this case is EEPROM memory. Search tables utilized by a tariffing algorithm according to the present invention, which are indicated by reference number 25, are stored in EEPROM memory 20. The processor unit 18 also controls block 21, which includes audio amplifiers and switches that amplify audio signals and connect them to the receiver or to an external speaker 23 and microphone 24, which constitute hands-free equipment. The pay phone part 11 communicates with the mobile phone part 12 through a mobile phone interface 22. The mobile phone interface connects to the mobile phone through its ordinary bus connection, which comprises its audio and data signal connections. For simplicity, the connection is shown in FIG. 3 only between the mobile phone interface 22 and the processor unit of the mobile phone part 28. The pay phone part 11 and mobile phone part 12 are arranged to cooperate, so in implementing the algorithm, the pay phone part continuously receives selected suitable location information or several pieces of usable location information from the mobile phone part. A country code MCC and a net code MNC are apparently the most suitable for use in tariffing algorithms.

An example of the operation of a tariffing algorithm and necessary search tables belonging to an advantageous embodiment of the present invention is shown in more detail in the following, with references to FIGS. 4–8. The destination zone of a call is defined in the tariffing algorithm by means of a known method using one or more search tables, an example of which is presented by search table #1 in FIG. 4. A number is converted to an international format by means of a number analysis, and the search tables are searched on that basis. The lefthand column of search table #1 shows examples of numbers converted to an international format and the righthand column shows corresponding destination zone definitions. Search table #1 shows only a few originating zone alternatives, which naturally may be more numerous than the four shown here. In addition to this type of table, the search tables may consist of other number tables that contain numbers with uniform charge rates regardless of the originating zone, or forbidden numbers, etc. The analysis may also include a definition that a number is forbidden if it cannot be found in the table.

Search table #2 of FIG. 5 presents an example of originating zone definition. It is advantageous to also arrange continuous updating of location information in the pay phone, and it is also advantageous to perform this part of the tariffing algorithm as soon as the location information changes. Search table #2 shows an example in which both the country code MCC and the net code MNC are used to define the originating zone. The search table can be arranged so that, for example, the search is performed linearly, meaning that the first condition that is met defines the originating zone. In an advantageous embodiment of the algorithm the originating zone is defined according to the general tariffing practice of the mobile station system in which the wireless pay phone operates. Search table #2 shows only a few examples of originating zones, and considerably more originating zone alternatives may exist than the four that are shown.

Because a large number of originating zone/destination zone combinations may exist, it is advantageous to reduce the number of tariffing alternatives, for example, by classifying the combinations. One may speak of distance classes, and they are called that herein. The search table #3 or distance class matrix of FIG. 6 presents an example of setting a distance class in a case where there are nine originating zone alternatives (lefthand column) and nine destination zone alternatives (righthand column). In this case, seven different distance classes 0–6 are specified, and each combination is classified in one of these classes.

Because factors other than originating zone and destination zone need to be taken into account in setting the charge rate, it is advantageous to further limit the charge rate alternatives by specifying a limited number of different charge rate classes. An example of this is presented by search table #4 of FIG. 7, in which six different charge rate classes are specified. In addition to seven different distance classes, factors such as the day of the week, the time and the type of pay card affect the setting of the charge rate class.

The weekday selection in the second column of the search table indicates the day of the week when the charge rate in question is in effect. The data may be one byte, for example, in which certain bits are ones to indicate days of the week. For example, 01000100 (LSB last) means that the alternative in question is selected on Sunday (second from the left) and Thursday (third from the right). The weekday is obtained in a pay phone by calculating it from the date read from a real time clock included in the pay phone. The weekday is advantageously calculated only once a day.

The time selection in the third column shows the time span within which the alternative in question is applied. A 16-bit field may be used here, with ones indicating the applicable time spans. Table 1 shows an example of time spans corresponding to bits number 0–15 of the time selection field.

TABLE 1

| Bit | Time span Starts | Ends |
| --- | --- | --- |
| 0 | 00:00 | 24:00 |
| 1 | 06:00 | 16:00 |
| 2 | 18:00 | 06:00 |
| 3 | 06:00 | 12:00 |
| 4 | 12:00 | 15:00 |
| 5 | 15:00 | 20:00 |
| 6 | 20:00 | 06:00 |
| 7–15 | Not in use | |

The time spans are independent of each other. The present time is obtained from the real time clock. If one of the time spans is valid at the moment, which means the present time is between the start and end points, the row in question in table #4 is in effect with regard to time.

The type of pay card also affects the charge rate class in search table #4. Identifying information for each type of pay card, as well as card class and card type are specified in a pay phone as a number from 0 –7, for example. Each card belongs to a class. An 8-bit card selection byte indicates the types of cards that the alternative in question may be applied to. For example, byte 00110001 selects card types 0, 4 and 5. For simplicity, only two card types are used in table #4: credit cards and phone cards. The pay phone part specifies the type of card based on the identifying information. This may be done using simple search tables, for example.

FIG. 8 presents a search table #5, which is used to set the charge rate corresponding to a charge rate class. The example table includes parameters 1–4, which correspond to each charge rate class, and which set the charge rate. Parameter 1 is the starting charge of the call, which may have four values in this example: 0, A1, A2 and A3. The value may be a monetary value, for example. Parameter 2 is elapsed time in seconds before time-based charging begins, and this parameter may also have four values in this example: 0, S1, S2 and S3. Parameter 3 is a unit charge for time-based charging, expressed as a monetary value, for example, and this parameter may have three values: 0, B1 and B2. Parameter 4 is the time in seconds between unit charges in time-based charging, and this parameter may also have three values: 0, T1 and T2.

An advantageous embodiment of the method and arrangement according to the present invention is described above with the help of examples, but it is clear that the innovative idea may be realized in a number of different ways. The present invention may vary within the limits of the enclosed claims.

What is claimed is:

1. An arrangement for setting a user charge rate in a pay phone, which includes:

a mobile phone part comprising a mobile phone that operates; in a mobile station system, and connected to said mobile phone part, a pay phone part for defining a destination zone of a call, characterized in that the pay phone part and mobile phone part comprise means for making location information maintained in the mobile phone part available for use by the pay phone part, the pay phone part comprises means for defining an originating zone of a call based on the location information, and the pay phone part includes means for setting the user charge rate based on at least the originating zone, the destination zone of the call and a tariffing algorithm.

2. The arrangement according to claim 1, characterized in that the location information includes one or more of the following: base station code, exchange code, network code (MNC), country code.

3. The arrangement according to claim 1, characterized in that a tariffing algorithm comprises a first part, which sets a distance class based on an originating zone and a destination zone.

4. The arrangement according to claim 3, characterized in that said tariffing algorithm also comprises:

a second part, which sets a user charge rate class based on at least the distance class, and a third part, which sets a user charge rate corresponding to a user charge rate class according to defined parameter values.

5. The arrangement according to claim 4, characterized in that said second part sets the user charge rate class based additionally on one or more of the following: day of the week, time of day and pay card that is used in the pay phone.

6. A method of setting a charge rate for a telephone call over a wireless telephone comprising the steps of:

using a locator in the telephone to determine an origination zone of the telephone call;

using an analyzer in the telephone to determine a destination zone of the telephone call;

using a computing device in the telephone to determine the charge rate for the telephone call based upon the origination zone and the destination zone.

7. The method of claim 6 wherein the step of using an analyzer in the telephone to determine a destination zone of the telephone call further comprises the steps of:

converting a phone number dialed into an international format; and associating the converted phone number to a destination zone by searching a destination zone table stored in a memory device in the telephone for a match to the converted phone number.

8. The method of claim 6 wherein the step of using a computing device in the telephone to determine the charge rate for the telephone call based upon the origination zone and the destination zone further comprises the steps of:

setting a distance class for the call based on the originating zone and the destination zone;

setting a charge rate class for the call based on the distance class and a time of the call; and inputting the distance class and charge rate class into the computing device to determine the charge rate for the call.

9. The method of claim 6 wherein the step of using a computing device in the telephone to determine the charge rate for the telephone call based upon the origination zone and the destination zone further comprises the step of determining a card class for a pay card used with the telephone, the card class being used to set the charge rate.

* * * * *